US011676053B2

(12) United States Patent
Eckhardt et al.

(10) Patent No.: US 11,676,053 B2
(45) Date of Patent: *Jun. 13, 2023

(54) SYSTEMS, METHODS, AND MEDIA FOR AUTOMATICALLY IDENTIFYING ENTREPRENEURIAL INDIVIDUALS IN A POPULATION USING INDIVIDUAL AND POPULATION LEVEL DATA

(71) Applicants: Wisconsin Alumni Research Foundation, Madison, WI (US); University of Maryland, College Park, College Park, MD (US)

(72) Inventors: Jonathan T. Eckhardt, Madison, WI (US); Bekhzod Khoshimov, Madison, WI (US); Brent Goldfarb, Washington, DC (US)

(73) Assignees: Wisconsin Alumni Research Foundation, Madison, WI (US); University of Maryland, College Park, College Park, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,582

(22) Filed: Apr. 15, 2022

(65) Prior Publication Data
US 2022/0245491 A1    Aug. 4, 2022

Related U.S. Application Data

(63) Continuation of application No. 16/404,597, filed on May 6, 2019, now Pat. No. 11,308,411.
(Continued)

(51) Int. Cl.
G06F 17/15    (2006.01)
G06N 7/00    (2023.01)
(Continued)

(52) U.S. Cl.
CPC ............... *G06N 7/00* (2013.01); *G06F 17/15* (2013.01); *G06F 17/18* (2013.01); *G06F 9/541* (2013.01)

(58) Field of Classification Search
None
See application file for complete search history.

(56) References Cited

U.S. PATENT DOCUMENTS

2008/0070206 A1    3/2008   Perilli
2018/0129755 A1    5/2018   Garner
(Continued)

OTHER PUBLICATIONS

Arcidiacono P, et al (2010) Beyond Signaling and Human Capital: Education and the Revelation of Ability. Am. Econ. J. Appl. Econ. 2(4):76-104.
(Continued)

*Primary Examiner* — Craig C Dorais
(74) *Attorney, Agent, or Firm* — Quarles & Brady LLP

(57) ABSTRACT

In some embodiments, systems, methods, and media for automatically identifying entrepreneurial individuals in a population using individual and population level data are provided. In some embodiments, a system is provided, comprising: a database storing: grades and identifying information for classes; a hardware processor configured to: calculate, for each class, a difficulty value based on the grade for each individual; modify grades associated with the individual based on the difficulties; determine a variance using the modified grades; determine an average variance; determine that the variance for a first individual is larger average; determine that the first individual is more likely than average to be entrepreneurial; in response to determining that the first individual is more likely than average to be entrepreneurial, add identifying information of the first student to a second database of potential entrepreneurs.

11 Claims, 7 Drawing Sheets

Related U.S. Application Data

(60) Provisional application No. 62/667,367, filed on May 4, 2018.

(51) Int. Cl.
*G06F 17/18* (2006.01)
*G06F 9/54* (2006.01)

(56) References Cited

U.S. PATENT DOCUMENTS

2019/0050373 A1  2/2019  Takano
2021/0133277 A1  5/2021  Takano

OTHER PUBLICATIONS

Åstebro T, et al (2011) Stars and Misfits: Self-Employment and Labor Market Frictions. Manage. Sci. 57(11):1999-2017.
Becker GS (1962) Investment in Human Capital: A Theoretical Analysis J. Polit. Econ. 70(5, Part2):9-49.
Bedard, K. 2001. "Human Capital versus Signaling Models: University Access and High School Dropouts." The Journal of Political Economy 109 (4). University of Chicago Press: 749-75.
Bernstein S, et al (2017) Attracting Early-Stage Investors: Evidence from a Randomized Field Experiment Attracting Early-Stage Investors. J. Finance 72(2):509-538.
Bram U (2017) The extraordinary silliness of American college grading. 1843 (Oct. 20).
Breiz RD (1989) College Grade Point Average as a Predictor of Adult Success: A Meta-Analytic Review and Some Additional Evidence. Public Pers. Manage. 18(1):11-22.
Daley B, et al (2014) Market Signaling with Grades. J. Econ. Theory 151:114-145.
Eesley CE, et al (2018) Impact: Stanford University's Economic Impact via Innovation and Entrepreneurship. Foundations and Trends® in Entrepreneurship 14(2):130-278.
Fini R, et al (2016) Student Entrepreneurship: Demographics, Competences and Obstacles. (Feb. 29).
Harackiewicz JM, et al(2002) Predicting success in college: A longitudinal study of achievement goals and ability measures as predictors of interest and performance from freshman year through graduation. J. Educ. Psychol. 94(3):562.
Hsu DH, et al (2007) Entrepreneurs from Technology-Based Universities: Evidence from MIT. Res. Policy 36(5):768-788.
Jaeger DA, et al (1996) Degrees Matter: New Evidence on Sheepskin Effects in the Returns to Education. Rev. Econ. Stat. 78(4):733-740.
Jones EB, et al (1990) College Grades and Labor Market Rewards. J. Hum. Resour. 25(2):253-266.
Junkunc M, et al (2009) Technical Specialized Knowledge and Secondary Shares in Initial Public Offerings. Manage. Sci. 55(10):1670-1687.
Koc E, et al (2016) Job Outlook 2017 (National Association of Colleges and Employers).
Lazear E (1977) Academic Achievement and Job Performance: Note. The American Economic Review, vol. 67, No. 2 (Mar. 1977), pp. 252-254.
Lazear EP (2004) Balanced Skills and Entrepreneurship. Am. Econ. Rev. 94(2):208-211.
Lazear EP (2005) Entrepreneurship. J. Labor Econ. 23(4):649-680.
Lucas RE (1978) On the Size Distribution of Business Firms. The Bell Journal of Economics, vol. 9, No. 2 (Autumn, 1978), pp. 508-523.
MacMillan I, et al (1985) Criteria used by venture capitalists to evaluate new venture proposals. J. Bus. Venturing 1:119-128.
MacMillan I, et al (1987) Research notes and communications: Characteristics distinguishing funded from unfunded business plans evaluated by venture capitalists. Strategic Manage. J. 8(6):579-585.
Mason C, et al (2004) What do Investors Look for in a Business Plan?: A Comparison of the Investment Criteria of Bankers, Venture Capitalists and Business Angels. Int. Small Bus. J. 22(3):227-248.
McCormick AC, et al (2005) Rethinking and Reframing the Carnegie Classification. Change: The Magazine of Higher Learning 37(5):51-57.
Mulhere K (2016) 8 Super Successful Businesses That Were Created by College Students. Money (Mar. 17).
Riley, JG. 1979. "Informational Equilibrium." Econometrica: Journal of the Econometric Society 47 (2). [Wiley, Econometric Society]: 331-59.
Roberts EB, et al (2011) Entrepreneurial Impact: The Role of MIT—An Updated Report. Foundations and Trends in Entrepreneurship.
Solomon GT, et al (2002) The state of entrepreneurship education in the United States: A nationwide survey and analysis. International journal of entrepreneurship education 1(1):65-86.
Spence, M. 1973. "Job Market Signaling." The Quarterly Journal of Economics 87 (3). Oxford University Press: 355-74.
Stiglitz JE (1975) The Theory of "Screening," Education, and the Distribution of Income. The American Economic Review, vol. 65, No. 3 (Jun. 1975), pp. 283-300.
Swift SA, et al (2013) Inflated applicants: attribution errors in performance evaluation by professionals. PLoS One 8(7):e69258.
Tyler JH, et al (2000) Estimating the Labor Market Signaling Value of the GED. Q. J. Econ. 115(2):431-468.
Ulrich K (2018) The Future Of Entrepreneurship Is Students. Forbes Magazine (May 24).
Van Der Sluis J, et al (2008) Education and entrepreneurship selection and performance: A review of the empirical literature. J. Econ. Surv. 22(5):795-841.
Wagner J (2003) Testing Lazear's jack-of-all-trades View of entrepreneurship with German Micro Data. Appl. Econ. Lett. 10(11):687-689.

SYSTEMS, METHODS, AND MEDIA FOR AUTOMATICALLY IDENTIFYING ENTREPRENEURIAL INDIVIDUALS IN A POPULATION USING INDIVIDUAL AND POPULATION LEVEL DATA

CROSS-REFERENCE TO RELATED APPLICATIONS

This application is a continuation of U.S. application Ser. No. 16/404,597, filed May 6, 2019, which is now U.S. Granted Pat. No. 11,308,411, issued Apr. 19, 2022, which application claims the benefit of and priority to U.S. Provisional Application No. 62/667,367, filed May 4, 2018, which is hereby incorporated herein by reference in its entirety for all purposes.

STATEMENT REGARDING FEDERALLY SPONSORED RESEARCH

N/A

BACKGROUND

Many entities are interested in identifying potential entrepreneurs, such as venture capital investors, business accelerators, companies interested in becoming more innovative, and universities interested in commercializing technologies based on research performed by faculty on campus. However, there is not a reliable, objective technique for identifying individuals that are likely to be entrepreneurial. An entity can ask individuals if they think of themselves as an entrepreneur, but this is a subjective determination, and the individual may not consider themselves to be an entrepreneur when asked, for example, because of a misconception about what it means to be an entrepreneur or due to a lack of experience.

Accordingly, systems, methods, and media for automatically identifying entrepreneurial individuals in a population using individual and population level data is desirable.

SUMMARY

In accordance with some embodiments of the disclosed subject matter, systems, methods, and media for automatically identifying entrepreneurial individuals in a population using individual and population level data are provided.

In accordance with some embodiments of the disclosed subject matter, a system for automatically identifying entrepreneurial individuals in a population using individual and population level data is provided is provided, the system comprising: a database storing: for each individual of at least ten thousand individuals: a grade for each of a plurality of classes completed by the individual; and identifying information of the class corresponding to each grade; and one or more hardware processors that are configured to: receive, from the database, identifying information of the classes completed by each of the at least ten thousand individuals; receive, from the database, the grade for each class for which identifying information was received; calculate, for each of the plurality of classes, a difficulty value of the class based on the grade for each individual having a grade for that class; modify, for each of the at least ten thousand individuals, each of a plurality of grades associated with the individual based on the difficulty of the class corresponding to the grade; determine, for each of the at least ten thousand individuals, a variation metric associated with the individual's grades using the modified grades; determine, based on the variation metric for each of the at least ten thousand individuals, an average variation metric; receive, for a first individual, a grade for each class completed by the first individual and corresponding identifying information for the classes; modify the first individual's grades based on the difficulty of the class corresponding to the grade; determine the variation metric of the first individual's grades using the first individual's modified grades; determine that the variation metric of the first individual's grades is larger than the average variation metric; in response to determining that the variation metric of the first individual's grades is larger than the variation metric, determine that the first individual is more likely than average to be entrepreneurial; in response to determining that the first individual is more likely than average to be entrepreneurial, add identifying information of the first student to a second database of entrepreneurial individuals.

In some embodiments, the variation metric is a variance.

In some embodiments, the variation metric is a coefficient of variation.

In some embodiments, the database stores for each individual of the at least ten thousand individuals a test score that is correlated with the individual's general aptitude, and the one or more hardware processors are further configured to: calculate, for each of the plurality of classes, the difficulty value of the class based on the test scores of individuals that received a grade for the class.

In some embodiments, the one or more hardware processors are further configured to determine, for each class, the class difficulty by generating a fixed effect regression model based on the following relationship: $grade_{i,c} = \beta Test_i + \delta_c + \varepsilon_{i,c}$ where $grade_{i,c}$ is the grade earned by an individual i in the class c, $Test_i$ is an aptitude test score of student i, $\beta$ is a statistical measure representing a portion of the grade that can be attributed to the test score $Test_i$, $\delta_c$ is a class dummy variable that corresponds to the class difficulty that is determined based on the fixed effect regression model, and $\varepsilon_{i,c}$ is an error term for student i.

In some embodiments, the one or more hardware processors are further configured to determine, for each class, the class difficulty by generating a fixed effect regression model based on the following relationship: $grade_{i,c} = \delta_c + \varepsilon_{i,c}$ where $grade_{i,c}$ is the grade earned by an individual i in the class c, $\delta_c$ is a class dummy variable that corresponds to the class difficulty that is determined based on the fixed effect regression model, and $\varepsilon_{i,c}$ is an error term.

In some embodiments, the one or more hardware processors are further configured to determine that the variation metric of the first individual's grades is larger than the average variation metric by at least one standard deviation above the average variation metric.

In accordance with some embodiments of the disclosed subject matter, a system for automatically identifying entrepreneurial individuals in a population using individual and population level data is provided, the system comprising: memory; and one or more hardware processors that are configured to: receive grade information associated with each of a plurality of individuals; determine, for each of the plurality of individuals, a variation metric associated with the individual's grades; identify a plurality of institutions, each of the plurality of institutions associated with at least one of the plurality of individuals; determine, for each institution associated with at least one individual, that an average variability metric associated with the institution is not stored in the memory; identify a first source of grade variability data for a first institution of the plurality of institutions, wherein the first institution is associated with a first individual of the plurality of individuals; retrieve grade variability data for the first institution from the first source of grade variability data; determine that the variation metric of first individual's grades is larger than the average variation metric determine that the variation metric of the first individual's grades is larger than the average variation metric associated with the first institution by at least one standard deviation; identify a second source of grade variability data for a second institution of the plurality of institutions, wherein the second institution is associated with a second individual of the plurality of individuals; retrieve grade variability data for the second institution from the second source of grade variability data; determine that the variation metric of the first individual's grades is not larger than the average variation metric associated with the second institution by at least one standard deviation; cause information to be presented indicating that the first individual is more likely to be entrepreneurial than the second individual.

In some embodiments, the plurality of individuals includes at least five thousand individuals.

In some embodiments, the one or more hardware processors are further configured to: compare, for each of the plurality of individuals, the variation metric of the first individual's grades to an average variation metric associated with the institution of the plurality of institutions associated with the individual; and rank the plurality of individuals likelihood of being entrepreneurial based on the comparisons.

In some embodiments, the one or more hardware processors are further configured to: determine that grade variability data is unavailable for a third institution, wherein the third institution is associated with a third individual of the plurality of individuals; determine that the third institution is likely to have similar grade variability to the second institution; in response to determining that the third institution is likely to have similar grade variability to the second institution, determine that the variation metric of the third individual's grades is larger than an average variation metric based on the grade variability data for the second institution by at least one standard deviation; and cause information to be presented indicating that the third individual is more likely to be entrepreneurial than the second individual.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can, for example, include systems, methods, and media) for automatically identifying entrepreneurial individuals in a population using individual and population level secondary data are provided.

Figure 1:
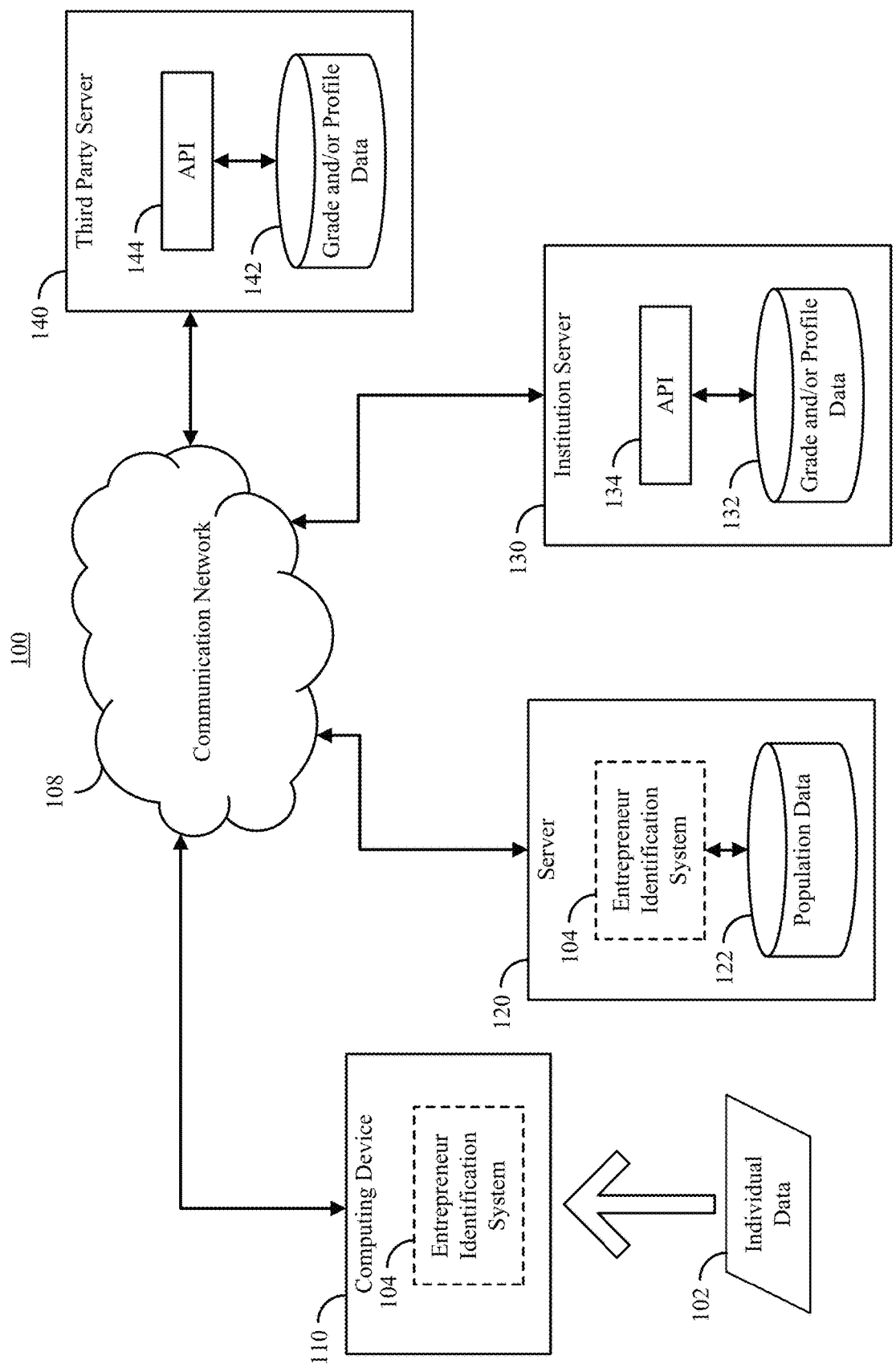
FIG. 1 shows an example of a system for automatically identifying entrepreneurial individuals in a population using individual and population level secondary data in accordance with some embodiments of the disclosed subject matter.

FIG. 1 shows an example 100 of a system for automatically identifying entrepreneurial individuals in a population using individual and population level secondary data in accordance with some embodiments of the disclosed subject matter. As shown in FIG. 1, a computing device 110 can receive individual data 102, such as one or more of an individual's performance metrics (e.g., grades, test scores, etc.), identifying information of the individual (e.g., identification number, email address, username, etc.), security information (e.g., a password, data indicative of one or more biometric characteristics, an access code, etc.), etc. In some embodiments, computing device 110 can receive individual data using any suitable input or inputs (e.g., as described below in connection with FIG. 2). In some embodiments, computing device 110 can receive data (e.g., performance metrics) that is to be used by the mechanisms described herein to evaluate the individual (e.g., as an image of a paper transcript, a file including the information, etc.). Additionally or alternatively, in some embodiments, computing device 110 can receive data (e.g., identifying information and/or security information) that can be used by the mechanisms described herein to retrieve data (e.g., performance metrics) that is to be used to evaluate the individual. For example, computing device 110 can present a user interface that allows a user to enter a username, student ID, email address, etc., and security information (e.g., a password, a passcode sent to the user's mobile device, etc.) in order to grant the mechanisms described herein access to the user's records (e.g., via an API executed by an institution server 130 described below).

In some embodiments, computing device 110 can execute at least a portion of an automatic entrepreneur identification system 104 to receive individual data 102, communicate with institution server 130 and/or a server 120 to determine population level data, calculate one or more metrics indicative of the individual's likelihood of being entrepreneurial, etc.

Additionally or alternatively, in some embodiments, computing device 110 can communicate information about individual data 102 to server 120 over a communication network 108, which can execute at least a portion of automatic entrepreneur identification system 104 to receive individual data 102 from computing device 110, communicate with institution server 130 to determine population level data, calculate one or more metrics indicative of the individual's likelihood of being entrepreneurial, etc.

Additionally or alternatively, in some embodiments, computing device 110 can communicate information about individual data 102 to institution server 130 over communication network 108 to retrieve the individual's data and/or grant access to the individual's data to server 120.

In some embodiments, computing device 110 and/or server 120 can be any suitable computing device or combination of devices, such as a desktop computer, a laptop computer, a smartphone, a tablet computer, a wearable computer, a server computer, a virtual machine being executed by a physical computing device, etc. In some embodiments, computing device 110 and/or server 120 can execute at least a portion of automatic entrepreneur identification system 104 to execute one or more portions of the processes described below in connection with FIGS. 3 and/or 4.

In some embodiments, computing device 110 and/or server 120 can calculate population level data (e.g., average variance at a particular institution, within a particular major, within a particular demographic group, etc.), and can store the information in a population data database 122.

In some embodiments, institution server 130 can be a server maintained by (or otherwise associated with) an institution, such as a university, investment firm, consulting firm, and/or government entity, to store information (e.g., within grade and/or profile database 132) about current and/or former students at the university and/or applicants to the firm, such as information about grades, classes, standardized test scores, high school grades, etc. In some embodiments, institution server 130 can provide access to an individual's records and/or to population level records (which may, in some cases, be anonymized) via an application program interface (API) 134. For example, API 134 can receive a request to access a particular record or records (e.g., based on a username, student ID, email address, etc.), can determine whether to grant access to the records (e.g., based on a password, passcode, security token, etc.), and provide information about the requested records when access is granted. In some embodiments, the information stored in grade and profile database 132 can be hashed such that the underlying information cannot be directly accessed (e.g., to protect personally identifying information that may be inferred from the underlying information).

In some embodiments, a third party server 140 can be a server maintained by (or otherwise associated with) a third party to store information (e.g., within grade and/or profile database 142) about current and/or former students at one or more institutions (e.g., universities, colleges, etc.), such as information about grades, classes, etc. In some embodiments, third party server 140 can provide access to aggregated records via an application program interface (API) 144 and/or via a web interface (e.g., third party server 140 can act to serve web pages including such information, and computing device 110 and/or server 120 can extract the information form the web page). For example, API 144 can receive a request to access a records for one or more classes associated with a particular institution (e.g., based on year, class identification information, subunit of the institution such as a department), can determine whether to grant access to the records (e.g., based on a password, passcode, security token, etc.), and provide information about the requested records when access is granted. In some embodiments, the information stored in grade and/or profile database 142.

In some embodiments, communication network 108 can be any suitable communication network or combination of communication networks. For example, communication network 108 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, etc. In some embodiments, communication network 108 can be a local area network, a wide area network, a public network (e.g., the Internet), a private or semi-private network (e.g., a corporate or university intranet), any other suitable type of network, or any suitable combination of networks. Communications links shown in FIG. 1 can each be any suitable communications link or combination of communications links, such as wired links, fiber optic links, Wi-Fi links, Bluetooth links, cellular links, etc.

Figure 2:
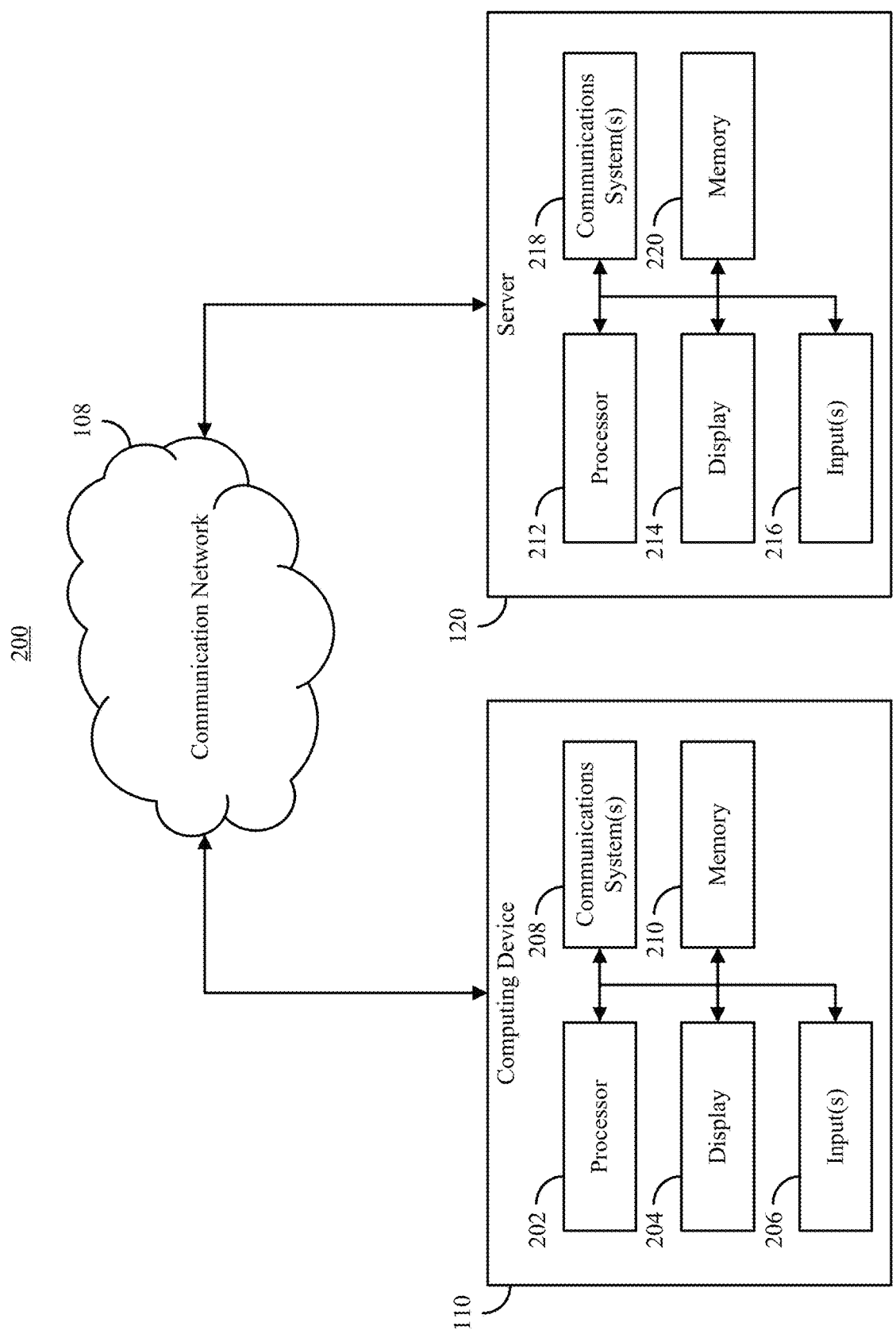
FIG. 2 shows an example 200 of hardware that can be used to implement a computing device and/or a server in accordance with some embodiments of the disclosed subject matter.

FIG. 2 shows an example 200 of hardware that can be used to implement computing device 110, and/or server 120 in accordance with some embodiments of the disclosed subject matter. As shown in FIG. 2, in some embodiments, computing device 110 can include a processor 202, a display 204, one or more inputs 206, one or more communication systems 208, and/or memory 210. In some embodiments, processor 202 can be any suitable hardware processor or combination of processors, such as a central processing unit (CPU), a graphics processing unit (GPU), etc. In some embodiments, display 204 can include any suitable display devices, such as a computer monitor, a touchscreen, a television, etc. In some embodiments, inputs 206 can include any suitable input devices and/or sensors that can be used to receive user input, such as a keyboard, a mouse, a touchscreen, a microphone, etc.

In some embodiments, communications systems 208 can include any suitable hardware, firmware, and/or software for communicating information over communication network 108 and/or any other suitable communication networks. For example, communications systems 208 can include one or more transceivers, one or more communication chips and/or chip sets, etc. In a more particular example, communications systems 208 can include hardware, firmware and/or software that can be used to establish a Wi-Fi connection, a Bluetooth connection, a cellular connection, an Ethernet connection, etc.

In some embodiments, memory 210 can include any suitable storage device or devices that can be used to store instructions, values, etc., that can be used, for example, by processor 202 to present content using display 204, to communicate with server 120 via communications system(s) 208, etc. Memory 210 can include any suitable volatile memory, non-volatile memory, storage, or any suitable combination thereof. For example, memory 210 can include RAM, ROM, EEPROM, one or more flash drives, one or more hard disks, one or more solid state drives, one or more optical drives, etc. In some embodiments, memory 210 can have encoded thereon a computer program for controlling operation of computing device 110. In such embodiments, processor 202 can execute at least a portion of the computer program to present content (e.g., a user interface, graphics, tables, etc.), receive input from a user, receive information from server 120, transmit information to server 120, etc.

In some embodiments, server 120 can include a processor 212, a display 214, one or more inputs 216, one or more communications systems 218, and/or memory 220. In some embodiments, processor 212 can be any suitable hardware processor or combination of processors, such as a CPU, a GPU, etc. In some embodiments, display 214 can include any suitable display devices, such as a computer monitor, a touchscreen, a television, etc. In some embodiments, inputs 216 can include any suitable input devices and/or sensors that can be used to receive user input, such as a keyboard, a mouse, a touchscreen, a microphone, etc.

In some embodiments, communications systems 218 can include any suitable hardware, firmware, and/or software for communicating information over communication network 108 and/or any other suitable communication networks. For example, communications systems 218 can include one or more transceivers, one or more communication chips and/or chip sets, etc. In a more particular example, communications systems 218 can include hardware, firmware and/or software that can be used to establish a Wi-Fi connection, a Bluetooth connection, a cellular connection, an Ethernet connection, etc.

In some embodiments, memory 220 can include any suitable storage device or devices that can be used to store instructions, values, etc., that can be used, for example, by processor 212 to present content using display 214, to communicate with one or more computing devices 110, etc. Memory 220 can include any suitable volatile memory, non-volatile memory, storage, or any suitable combination thereof. For example, memory 220 can include RAM, ROM, EEPROM, one or more flash drives, one or more hard disks, one or more solid state drives, one or more optical drives, etc. In some embodiments, memory 220 can have encoded thereon a server program for controlling operation of server 120. In such embodiments, processor 212 can execute at least a portion of the server program to transmit information and/or content (a user interface, population data, etc.) to one or more computing devices 110, receive information and/or content from one or more computing devices 110, calculate population level data, receive data from institution server 130, receive instructions from one or more devices (e.g., a personal computer, a laptop computer, a tablet computer, a smartphone, etc.), etc.

Although not shown, institution server 130 can be implemented using similar hardware to that shown for implementing server 120, and a processor of institution server 130 can execute at least a portion of a server program to transmit information and/or content (e.g., individual records, statistics for groups of records, etc.) to computing device 110 and/or server 120.

Figure 3:
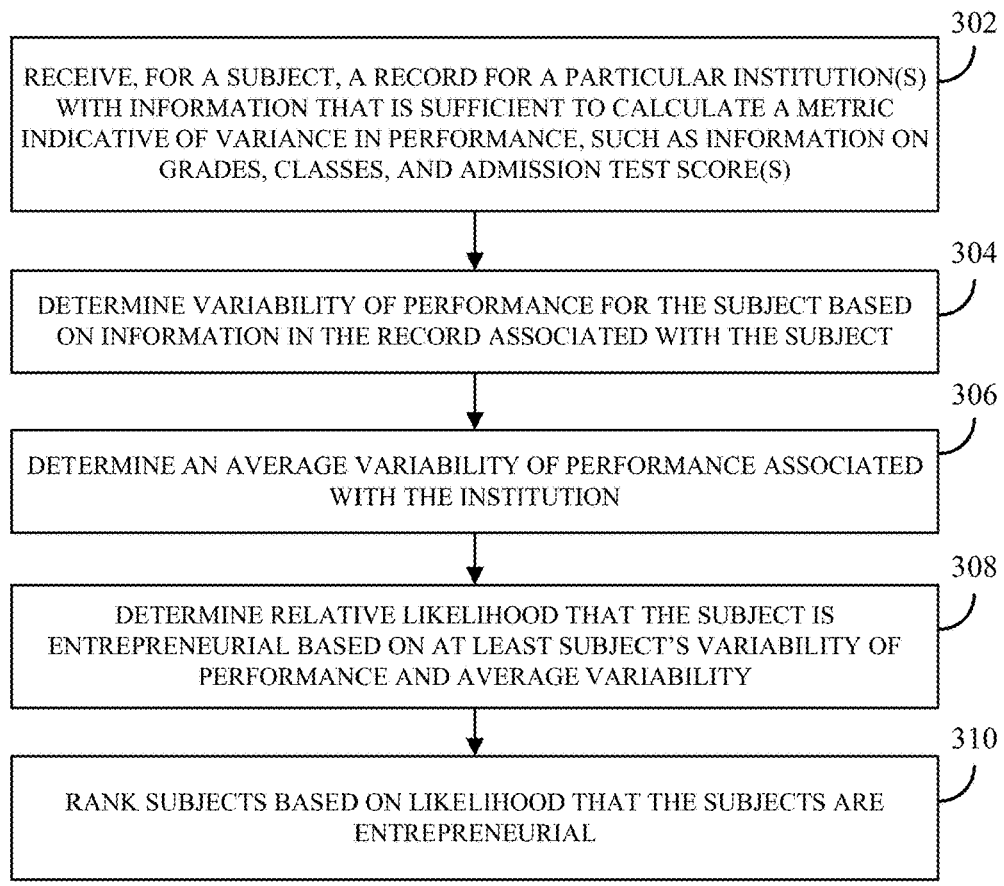
FIG. 3 shows an example of a process for automatically detecting individuals that are more likely to be entrepreneurial in a population in accordance with some embodiments of the disclosed subject matter.

FIG. 3 shows an example 300 of a process for automatically detecting individuals that are more likely to become entrepreneurial in a population in accordance with some embodiments of the disclosed subject matter.

At 302, process 300 can receive, for a particular subject or subjects, a record for a particular institution (e.g., a university attended by the subject) that includes information that is sufficient to calculate a metric that is indicative of variance in performance of the subject. For example, such information can include information about classes taken, grades received in those classes, credits associated with classes taken, standardized test scores (e.g., ACT, SAT, etc.).

In some embodiments, such information can be received in electronic form. For example, the information can be received from a database (e.g., based on a request submitted by the subject, based on a request submitted by an entity associated with process 300), from a storage medium, etc., in an electronic format. As another example, the information can be received in a legacy format, such as a paper transcript. In such an example, process 300 can receive the information in an electronically accessible form based on information extracted from the legacy format, which can be performed manually (e.g., by a user entering the information into a database using a user interface) or automatically (e.g., using optical character recognition techniques).

At 304, process 300 can determine a variability in performance for the subject based on information from the record associated with the subject and the institution. For example, process 300 can calculate a mean performance (e.g., a grade point average), a variance in performance (e.g., a value indicative of the distribution of grades), and/or a coefficient of variation (e.g., a value indicative of the distribution of grades in relation to the mean/grade point average).

As described in Appendix C, a subject that exhibits a wider distribution may be more likely to be entrepreneurial. However, because different institutions may have different grading practices, it is helpful to compare the variation exhibited by the subject to information about the variation in the population of the institution.

At 306, process 300 can determine an average variability of performance associated with the particular institution. For example, process 300 can determine the mean for the population and/or one or more subpopulation at the institution. In such an example, process 300 can calculate mean performance (e.g., a mean grade point average), a mean variance in performance (e.g., a value indicative of the distribution of grades for the average student at the institution), and/or a mean coefficient of variation (e.g., a value indicative of the distribution of grades in relation to the mean/grade point average for the average student at the institution) for the population and/or one or more subpopulations (e.g., students within a particular major, department, college, school, class, etc.). As another example, process 300 can generate a distribution for grade point average, variance in performance, and/or coefficient of variation.

At 308, process 300 can determine a relative likelihood that the subject is an entrepreneur and/or is likely to be entrepreneurial. In some embodiments, process 300 can determine the relative likelihood based on the subject's variability of performance and/or the average variability of performance at the institution. For example, if the variance of the subject's grades is larger than the average variance this can indicate that the subject is more likely than an average student to be an entrepreneur and/or be entrepreneurial. As another example, if the coefficient of variation of the subject's grades is larger than the average coefficient of variation this can indicate that the subject is more likely than an average student to be an entrepreneur and/or be entrepreneurial. In some embodiments, the difference between the average variability and the variability associated with the subject can be indicative of degree to which the subject is more or less likely to be entrepreneurial. For example, if the variance or coefficient of variability associated with the subject is at least one standard deviation above the average, this can indicate that the subject is significantly more likely (e.g., on the order of 40-50% more likely) to be an entrepreneur and/or be entrepreneurial.

At 310, process 300 can rank the subject against other subjects from the same institution and/or from other institutions based on the likelihood that the subject is an entrepreneur and/or is entrepreneurial. For example, each subject can be ranked based on how much the subject's variance and/or coefficient of variation exceeds or falls below the average at that subject's institution. In such an example, a first subject may have a greater variance that a second subject, but the second subject may be ranked as more likely to be entrepreneurial because the average variance at the second subject's institution is higher.

Figure 4:
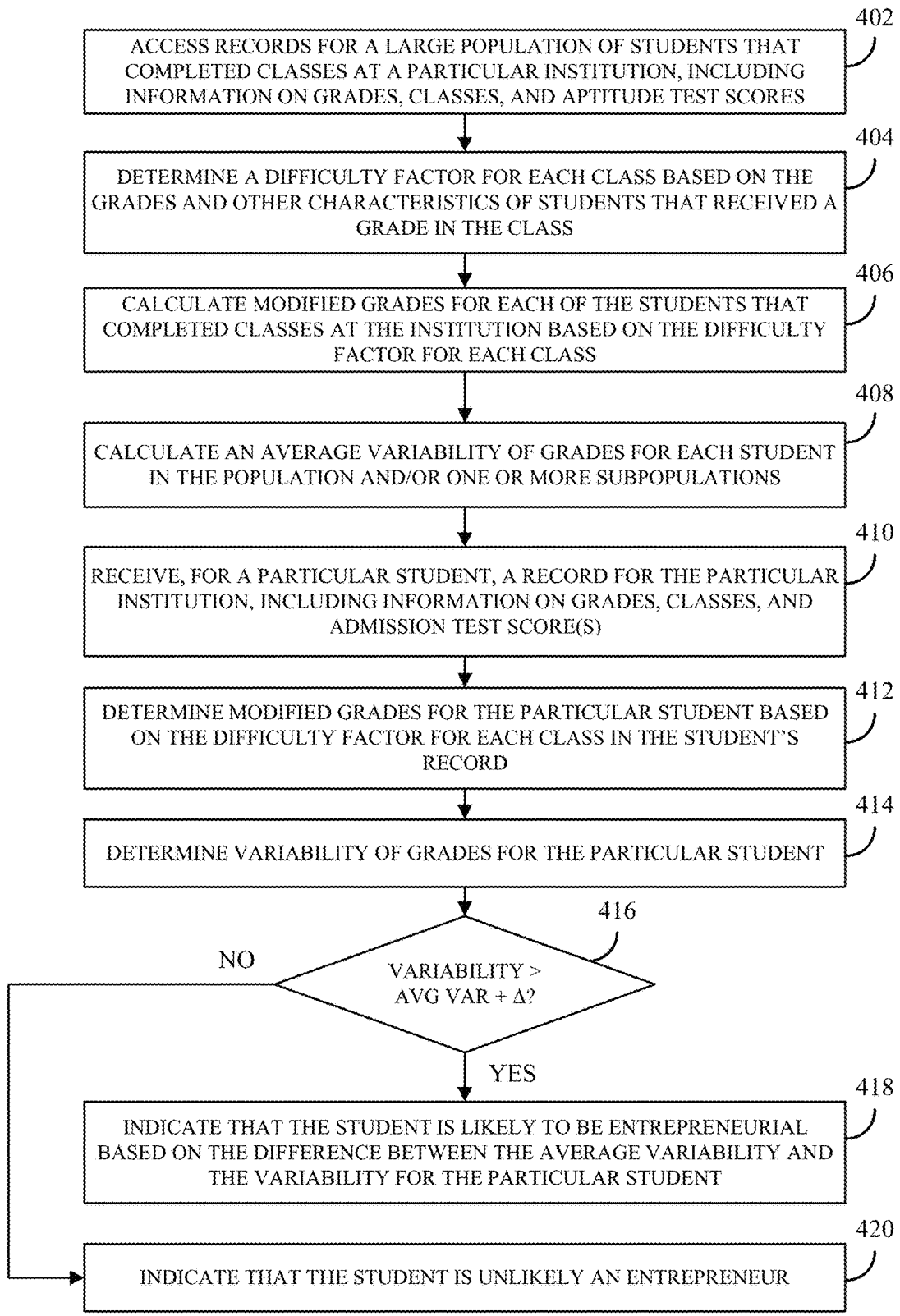
FIG. 4 shows an example of a process for automatically determining whether an individual in a population is likely to be entrepreneurial using individual and population level secondary data in accordance with some embodiments of the disclosed subject matter

FIG. 4 shows an example 400 of a process for automatically determining whether an individual in a population is likely to be entrepreneurial using individual and population level secondary data in accordance with some embodiments of the disclosed subject matter. As shown in FIG. 4, at 402, process 400 can access records for a large population of individuals (e.g., hundreds, thousands, tens of thousands, or hundreds of thousands, representing thousands, tens of thousands, hundreds of thousands, or millions of grades) that completed classes at a particular institution, including information such as grades (e.g., as a letter or number), identifying information of classes (e.g., by name, number, etc.), aptitude test scores (e.g., ACT scores, SAT scores, etc.), high school grades (e.g., a high school grade point average from a individual's application), advanced placement credits, etc.

In some embodiments, process 400 can access the records via an API (e.g., as described above in connection with FIG. 1). Additionally or alternatively, in some embodiments, process 400 can access the records from a database including the records to which the computing device executing process 400 has read access. In some embodiments, the information accessed at 402 can be anonymized and/or masked (e.g., through hashing) to disguise identifying information of the individuals.

At 404, process 400 can determine a difficulty factor $\delta_c$ for each class using any suitable technique or combination of techniques. For example, process 400 can determine difficulty based on grades for a particular class and an indication of the general aptitude (e.g., which generally would not take into account aptitude for a particular subject). In a more particular example, the difficulty factor $\delta_c$ can be calculated based on the grade of each individual, a proxy for the individuals' aptitude such as one or more of an aptitude test score, a high school GPA, number of advance placement credits, etc. Techniques for calculating a difficulty factor $\delta_c$ for each class are described in more detail in Appendix C, which is hereby incorporated by reference herein in its entirety.

In some embodiments, the difficulty of a class can be calculated based on only grades from particular year, a particular section (e.g., taught by a particular staff member (s)), etc. Alternatively, the difficulty of a class can be calculated based on grades across multiple years and/or sections of the same class (e.g., having the same name, the same number, etc.).

In some cases, the difference in dispersion in grades between student-entrepreneurs (e.g., students that are more likely to be entrepreneurial) and student-seekers (e.g., students that are less likely to be entrepreneurial) may be driven by differences in the difficulty of courses taken between these two groups of students. In some embodiments, measures of within student dispersion in grades can be adjusted to account for differences in course difficulty. In some embodiments, a fixed-effect regression model can be estimated as follows:

$$\text{grade}_{i,c} = \beta \text{Test}_i + \delta_c + \varepsilon_{i,c} \quad (1)$$

where $\text{grade}_{i,c}$ is the grade earned by a student i in a class c, $\text{Test}_i$ is a standardized test score (e.g., an ACT score, SAT score, etc.) of student I, $\beta$ is a statistical measure representing a portion of the grade that can be attributed to the test score $\text{Test}_i$, $\delta_c$ is a class dummy variable that incorporates attributes unique to the class that is associated with grade, and $\varepsilon_{i,c}$ is an error term. In some embodiments, a regression analysis can be used to find a value of $\delta_c$ that best predicts the difficulty of class c, which can represent the attributes of the class that may influence the grade earned by students (such as student i in class c). The error term can be unique for each individual and class that can be determine during a regression analysis. For example, the error term for each student can be adjusted to attempt to find values that minimize the sum of the squared errors between the predicted grade (e.g., based on the students test score and class difficulty) and the actual grades received by the students. This approach can be used to estimate a single estimate of course difficulty for each class.

Additionally or alternatively, in some embodiments, a fixed-effect regression model can be estimated as follows:

$$\text{grade}_{i,c} = \delta_c + \varepsilon_{i,c}, \quad (2)$$

where $\text{grade}_{i,c}$ is the grade earned by a student i in a class c, $\delta_c$ is a class dummy variable that incorporates attributes unique to the class that is associated with grade, and $\varepsilon_{i,c}$ is an error term. In some embodiments, a regression analysis can be used to find a value of $\delta_c$ that best predicts the difficulty of class c, which can represent the attributes of the class that may influence the grade earned by students (such as student i in class c). In such embodiments, in the absence of information that can be used to estimate the expected performance of each student (e.g., based on standardized test score) this regression can estimate the distribution of grades that are typical or expected for each class. For example, the regression analysis can be used to determine grades that are typically assigned in a given class.

In some embodiments, $\delta_c$, can be used as a dummy variable that captures unobserved heterogeneity between classes that influences grading. The larger the dummy, the easier the class is estimated to be. For example, this estimation was performed on a population of 29,484 undergraduate students who completed 682,968 different courses over a period of twenty-two semesters. Due to limitations in making meaningful inferences about grading for small classes, courses in which less than seven students were enrolled were excluded from the estimation of course difficulty. Hence no grade adjustment was made in the GPA calculation for grades earned in courses that included seven or fewer students. After calculating the difficulty for each class, the grades can be adjusted and an adjusted GPA can be calculated, variance, and coefficient of variability of grades for each student can also be calculated. Each grade can adjusted using the following:

$$\text{Adjusted grade}_{i,c} = \text{grade}_{i,c} - \text{delta}_c, \quad (3)$$

Figure 7:
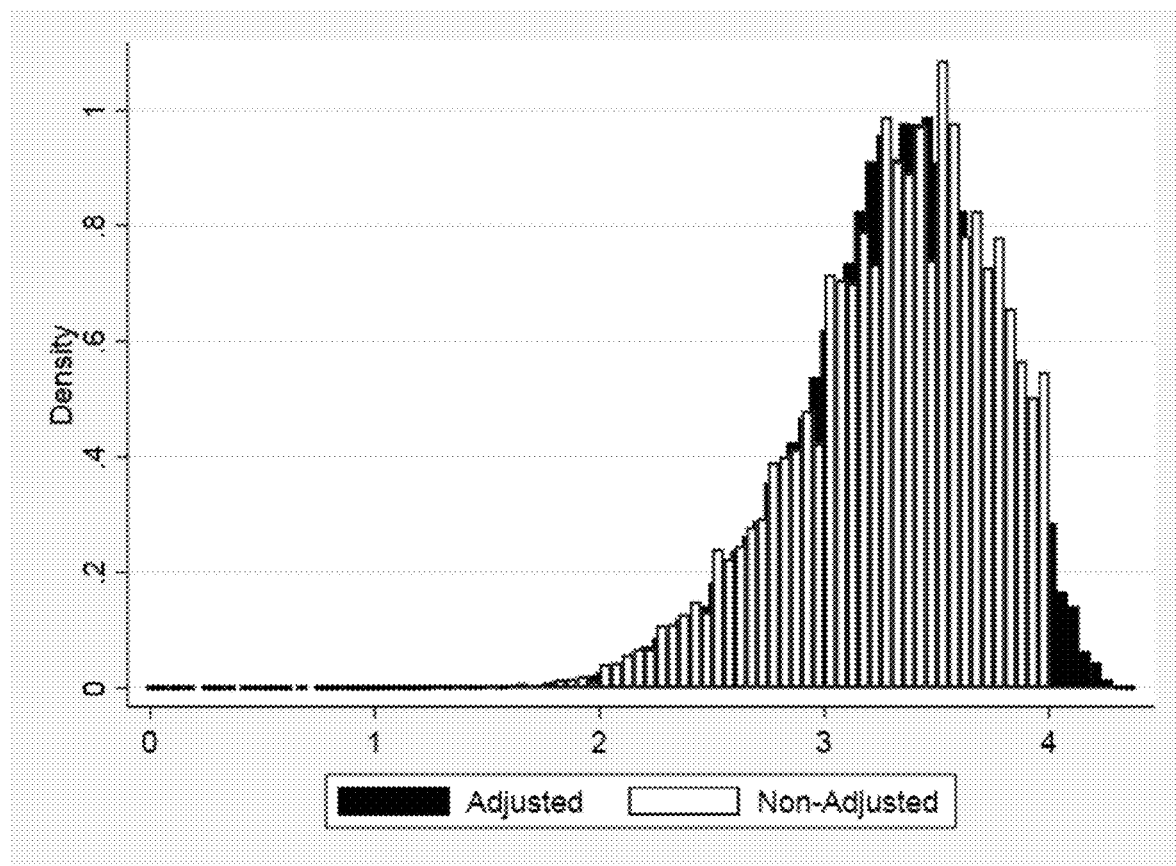
FIG. 7 shows an example of a histogram of mean grades for a large sample of students before and after an adjustment for course difficulty.

This adjustment can mitigate the relative difficulty of different classes taken as a source of variability in grades. After the adjustment, GPA can exceed the conventional scale (e.g., a maximum of 4.0), as students who earn an "A" in difficult courses can be awarded more than 4 grade points per credit hour for that class. As described below, FIG. 7 is a histogram comparing the distribution of grades at a particular institution prior to adjustment, and after adjustment for difficulty.

As a result of the adjustment, the variability of grades of the population can be compressed. For example, based on the sample of 29,484 undergraduate students described above, the mean variance of grades for the sample decreased by 27%, from 0.374 to 0.275, and the mean of the coefficient of variation decreased by 15%, from 0.177 to 0.154. Thus, the class fixed-effect technique described above of adjusting for the class difficulty reduced the variability in grades that was likely due to characteristics of the classes (e.g., rather than the students), leaving differences in the allocation of effort as the primary reason for variability in grades. As described in Appendix C, after accounting for course difficulty, entrepreneurial students exhibit, based on confidence intervals, between 0.00494 and 0.084 higher variability of grades. This appears to be a relatively large effect. The standard deviation of adjusted grade variability is 0.09 (See Table 2 of Appendix C). Accordingly, this reflects a difference in standard deviation of between 0.05 and 0.94. Stated another way, the null hypothesis of no relationship can be rejected. Note that ACT scores were missing for 831 students, and the analysis described above was recalculated with the measure of ACT score omitted, the results of which are summarized in Table 5 of Appendix C.

Note that the results summarized in Table 4 of Appendix C are consistent with having higher variance in effort allocation being predictive of entrepreneurship as compared to GPA-maximizing student-seekers. Indeed, student-entrepreneurs, on average, tend to exhibit higher grade variability than student-seekers.

In some embodiments,

At 406, process 400 can calculate modified grades for each of the individuals that completed classes based the calculated difficulty of the classes for which the individual received grades using any suitable technique or combination of techniques. For example, process 400 can adjust each grade based on the difficulty factor $\delta_c$. In a more particular example, process 400 can adjust each grade by subtracting the difficulty factor $\delta_c$ from the initial grade which can increase the grade for difficult classes, and decrease the grade for less difficult classes. Note that this can result in some adjusted grades being higher than the highest grade permitted by the institution. For example, if the highest grade allowed is a 4.0, and the difficulty factor $\delta_c$ for a class is −1.2, if a individual received a 4.0 in that class, the adjusted grade would be a 5.2 (i.e., 4.0 −$\delta_c$).

At 408, process 400 can calculate an average variability of grades for each individual in the population and/or among one or more sub-populations. For example, process 400 can calculate, for each individual, a grade point average (e.g., using values to represent letter grades, such as the conventional 4 scale), a variance in the individual's grades, and/or a coefficient of variation. In such an example, process 400 can determine the average variability in the population of individuals based on the individual coefficients of variation. In some embodiments, process 400 can calculate different average variabilities for different sub-populations, such as within a particular major, within a particular school or college within the institution (e.g., the business school, the college of engineering, etc.). As another example, process 400 can calculate average variability of different demographic groups (e.g., by matriculation year, age, gender, race and/or ethnicity, etc.).

At 410, process 400 can receive, for a particular subject, a record of the individual's attendance at the particular institution, which can include information about grades, classes, and, in some cases, other information about the individual's general aptitude. As described above in connection with FIG. 1, process 400 can receive the information from any suitable source, such as from a computing device (e.g., as a file or document representing the individual's record), from a server maintained by or on behalf of the institution (e.g., institution server 130). As described above in connection with 302 of FIG. 3, information associated with a particular subject can be received in electronic form and/or in a legacy format (e.g., a paper transcript).

At 412, process 400 can determine modified grades for the particular individual based on the difficulty factor of the classes for which the individual received grades. In some embodiments, process 400 can calculate the modified grades based on the original grade and the difficulty factor $\delta_c$. Additionally or alternatively, process 400 can receive or access modified grades that have been previously calculated (e.g., at 406, at 412 during a previous execution of process 400) for that individual.

At 414, process 400 can determine the variability in the modified grades of the particular individual. For example, process 400 can calculate a grade point average (e.g., using values to represent letter grades, such as the conventional 4 scale), a variance in the individual's grades, and/or a coefficient of variation. For example, such measures can be determined as described above in connection with 304.

At 416, process 400 can determine whether the variability of the particular individual's grades are greater than one or more average variabilities. Additionally or alternatively, in some embodiments, process 400 can determine whether the variability of the particular individual's grades are greater than one or more average variabilities by at least a threshold amount (Δ). For example, process 400 can determine whether the variability is at least one standard deviation (or 2 standard deviations, etc.), greater than the average variability.

If process 400 determines that the individual's variability of grades is not greater than the average variability and/or a threshold amount Δ greater than the average ("NO" at 416), process 400 can move to 420 and can indicate that the individual is unlikely to be entrepreneurial. Otherwise, if process 400 determines that the individual's variability of grades is greater than the average variability and/or a threshold amount Δ greater than the average ("YES" at 416), process 400 can move to 418. At 418, process 400 can indicate that the individual is a likely to be entrepreneurial based on the difference between the average variability in grades, and the variability for the particular individual.

In some embodiments, process 400 can take one or more actions without further user intervention in response to determining that the individual's variability of grades is greater than the average variability and/or a threshold amount Δ greater than the average at 416. For example, process 400 can flag the individual as a potential entrepreneur. As another example, process 400 can send a message to the individual inviting the individual to learn about an entrepreneurship program at the institution. As yet another example, process 400 can add the individual to a list to be contacted about events involving entrepreneurship.

In some embodiments, process 400 can be used by an entity that has access to relatively robust data about the grades of a population of students at a particular institution(s). For example, an entity that has access to the distribution of grades in each class to be used in evaluating variation in the grades of a particular subject. For example, process 400 can be used within an institution (which, as the issuer of grades, almost certainly has access to robust information about grades over the entire population). For example, a university can use process 400 to implement a process and/or system for finding entrepreneurial students within the student body. These entrepreneurial students can be given the opportunity to facilitate commercialization of technologies developed at least in part at the university (e.g., by faculty, graduate students, etc.) and/or to provide entrepreneurial students with support that can facilitate the students' formation of businesses (and/or other types of organization).

As another example, a university can use process 400 to implement a process and/or system for identifying entrepreneurial students in an application pool for a particular school or degree program (e.g., a pool of MBA applicants, a pool of students applying for admission to the computer science department).

Note that, in some embodiments, at least a portion of process 400 can used to update average variability and/or variability for particular individuals as new information becomes available. In a relatively large institution, this can involve performing millions of calculations, which can require minutes to hours of computing effort depending on the number of students included in the analysis and the number of grading periods (e.g., semesters, trimesters, quarters, etc.). Additionally, if new data and/or updated data is received the new/updated data is analyzed with at least a portion of the existing data (e.g., all of the existing data, a predetermined amount of the most recent data such as the most recent X semesters of existing data) in order to properly incorporate the new/updated data. For example, a first analysis can be performed to determine the mean grade (e.g., GPA) and mean variance (and/or coefficient of variation) for an institution, as well as class difficulty for each class for which sufficient data exists, for n semesters of data. If new and/or updated data is received for semester n+1, a second analysis can be performed to determine the mean grade (e.g., GPA) and mean variance (and/or coefficient of variation) for an institution, as well as class difficulty for each class for which sufficient data exists, for the n+1 semesters, which can require reanalyzing the data from at least a portion of the first n semesters in light of the new information. This can allow entrepreneurial students, potential employees, etc., within a relatively short period of time after updated information is available, an operation that would be effectively impossible for a human to achieve due to the massive amounts of data being used to, for example, adjust for difficulty of different courses.

Figure 5:
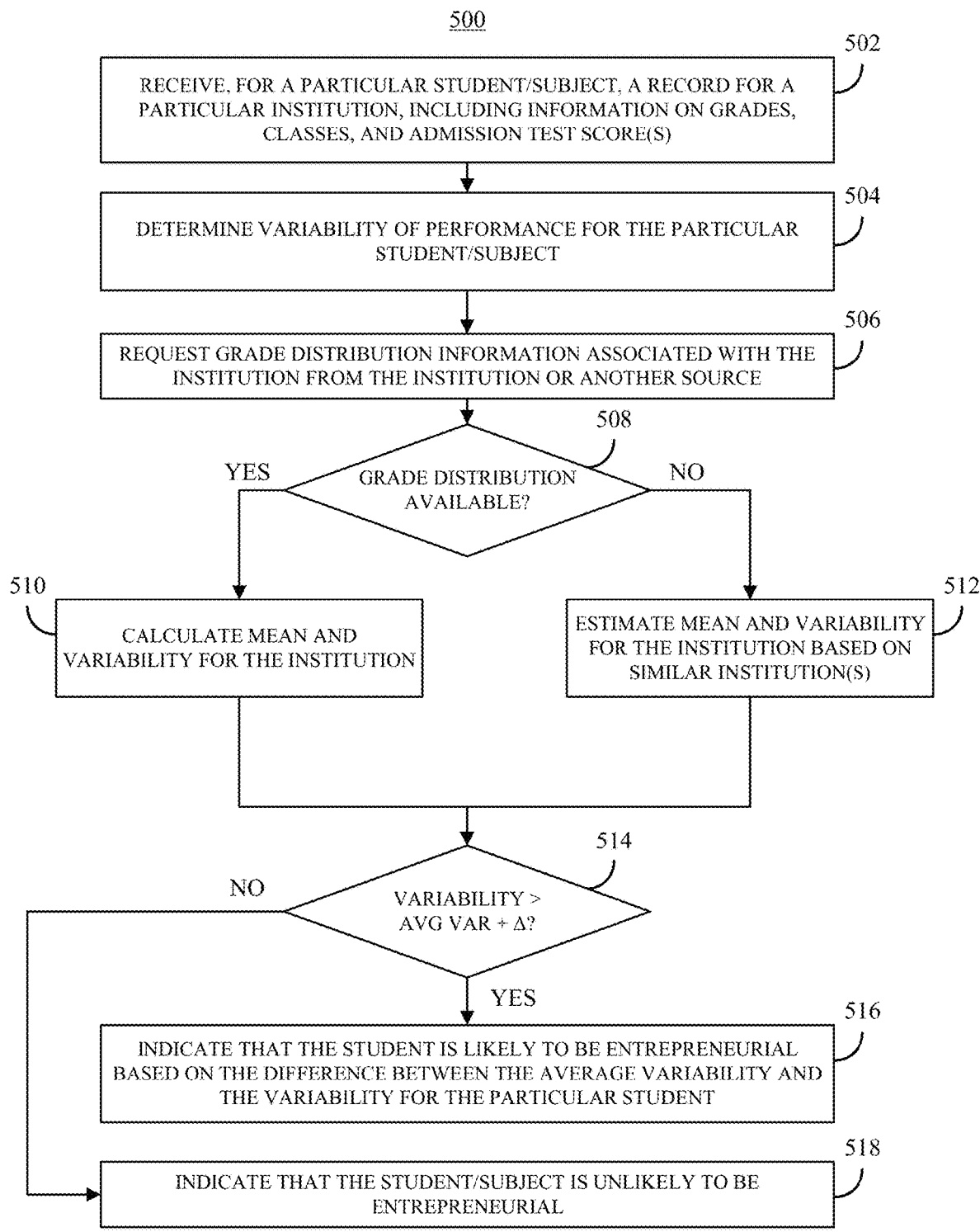
FIG. 5 shows an example of a process for automatically determining whether an individual is likely to be interested in becoming an entrepreneurial using individual and population level data in accordance with some embodiments of the disclosed subject matter.

FIG. 5 shows an example 500 of a process for automatically determining whether an individual is likely to be entrepreneurial using individual and population level data in accordance with some embodiments of the disclosed subject matter.

At 502, process 500 can receive, for a particular subject, a record of the individual's attendance at the particular institution, which can include information about grades, classes, and, in some cases, other information about the individual's general aptitude. As described above in connection with FIG. 1, process 500 can receive the information from any suitable source, such as from a computing device (e.g., as a file or document representing the individual's record), from a server maintained by or on behalf of the institution (e.g., institution server 130) and/or a third part (e.g., third party server 140). As described above in connection with 302 of FIG. 3, information associated with a particular subject can be received in electronic form and/or in a legacy format (e.g., a paper transcript).

At 504, process 500 can determine a variability of performance (e.g., a variability in grades) for the particular subject. For example, process 500 can calculate a mean, a variance, and/or a coefficient of variation based on the grade information included in the record. For example, such measures can be determined as described above in connection with 304.

At 506, process 500 can request and/or obtain grade distribution information associated with the institution from the insertion itself and/or from another source. For example, the institution may provide access to relatively robust information about the average GPA and/or the variance of GPA at the institution and/or portions of the institution (e.g., departments, major, class, etc.). As another example, access to similar information can be provided by a third party, such as an entity that aggregates such information for multiple institutions. In such an example, a third party can receive the information from the institution itself (e.g., via a contractual or other type of relationship) and/or from another source (e.g., from students self-reporting grades, from an employer or employers that gather information from transcripts submitted by current or prospective employees, etc.). For example, robust data about grades from four Virginia public universities is currently available at vagrades(dot)com. Such information can be requested and/or extracted to determine a mean GPA, a variance, and/or a coefficient of variation.

At 508, process 500 can determine if grade distribution information is available for the particular institution associated with the subject. For example, process 500 can determine whether the process 500 has already accessed the information (e.g., during an evaluation of a previous subject), and if so can use a cached version of the information, and/or can determine the source of the information such that the information can be gathered from the same source (if possible). As another example, process 500 can determine (e.g., based on a database maintained by the entity associated with process 500 and/or another entity such as one or more institutions, or a third party) whether process 500 has authorization to request the information from a repository that includes the grade information for that institution. In such an example, process 500 can determine that the entity associated with process 500 has a subscription that permits access to a particular repository of information for one or more institutions, and can determine whether the institution is one of the for which information is available via the repository.

As yet another example, process 500 can query a search engine for information about a particular institution. In some embodiments, process 500 can prompt a user to assist process 500 in identifying a source of such information, and whether the source provides information that can be used to determine mean GPA, mean variance, and/or mean coefficient of variation.

If process 500 determines that grade distribution information is available for a particular institution of interest ("YES" at 508), process 500 can calculate the mean and variability information for the institution, at 510.

Otherwise, if process 500 determines that grade distribution information is not available for a particular institution of interest ("NO" at 508), process 500 can estimate the mean and variability information for the institution if such information is available for one or more similar institutions, at 512. In some embodiments, process 500 can use any suitable technique or combination of techniques to estimate the mean and variability information based on information from a similar institution. For example, process 500 can use school rankings as a proxy for mean and variability. If information is known for institutions of various rankings (e.g., rankings established annually by U.S. NEWS AND WORLD REPORTS), the information for other institutions can be inferred based on the known information. In a more particular example, if an institution is a public university, information from other public universities of similar rank can be used to infer the information for the public university. As another example, if an institution is a public university, information from other public universities and/or from private universities of similar rank can be used to infer the information for the public university if a relationship between mean GPA and mean variability between public and private universities is known and/or can be inferred.

As another example, institutions and/or parts of an institution (e.g., departments, schools, colleges, majors, etc.) can be clustered based on one or more metrics, such as a whether the institution is public or private, enrollment, the amount of research performed at the institution (if any), etc., and process 500 can determine whether information is known or available for one or more other institutions in a cluster with the institution of interest, and if that information is available, it can be used to estimate the mean and variability for the institution.

As yet another example, if some information is known about an institution, such as mean GPA, but other information is not available, the other information can be estimated based on information from another institution(s).

At 514, process 500 can determine whether the variability of the particular subject's grades are greater than one or more average variabilities. Additionally or alternatively, in some embodiments, process 500 can determine whether the variability of the particular subject's grades are greater than one or more average variabilities by at least a threshold amount ($\Delta$), and/or by how much the particular subject's grades are greater than the average. For example, process 500 can determine whether the variability is at least one standard deviation (or 2 standard deviations, etc.), greater than the average variability.

If process 500 determines that the individual's variability of grades is greater than the average variability and/or a threshold amount $\Delta$ greater than the average ("YES" at 514), process 500 can move to 516. At 516, process 400 can indicate that the individual is entrepreneurial and/or is likely to be entrepreneurial based on the difference between the average variability in grades, and the variability for the particular individual.

Otherwise, if process 500 determines that the subject's variability of grades is not greater than the average variability and/or a threshold amount $\Delta$ greater than the average ("NO" at 514), process 500 can move to 518 and can indicate that the subject is unlikely to be entrepreneurial.

In some embodiments, process 500 can take one or more actions without further user intervention in response to determining that the subject's variability of grades is greater than the average variability and/or a threshold amount $\Delta$ greater than the average at 514. For example, process 500 can flag the subject as a potential entrepreneur. As another example, process 500 can add the subject to a ranking of potential entrepreneurs.

In some embodiments, process 500 can be used by an entity that has access to less complete data about the grades of a population of students at a particular institution(s). For example, an entity that has access to only the mean GPA and mean variability at a particular institution. For example, process 500 can be used by investors (e.g., venture capital firms, business accelerators) or consulting firms, and can be used to identify entrepreneurial individuals in a population of applicants.

In a more particular example, an inventor or consulting firm can use process 500 to find entrepreneurial students in a student body that may be receptive to receiving resources such as time and/or capital from an investor or consultant.

In another more particular example, investors can use process 500 to screen for entrepreneurial individuals amongst applications for venture funding. In such an example, the investor (e.g., an accelerator, a venture capital fund, a government agency, etc.) can receive over 5,000 applications a year, each of which may be associated with multiple individuals (e.g., co-founders, management teams, etc.). Using process 500 (and/or process 400 if the investor can access more detailed information) can facilitate screening for organizations (e.g., businesses, startup businesses, a portion of another organization or organizations such as a subsidiary, a joint venture, a research unit, a research lab, a research group, etc. that have submitted a proposal soliciting an investment and/or grant) and/or individuals (e.g., that have submitted a proposal soliciting an investment and/or grant in a proposed business, in a proposed research plan, in a proposed product, etc.), that are likely to be more successful because they are led by individuals that are more likely to be entrepreneurial. Note that, calculating the relevant metrics manually would be practically impossible, especially because these 5,000+ applicants are likely to be associated with a diverse group of institutions. While a computing device (e.g., a service and/or a client device) can identify which individuals associated with each investment opportunity are more likely to be entrepreneurial on a tractable timeline (e.g., it would not be useful to determine that an individual is likely to be entrepreneurial after the investment opportunity is no longer available), which would be impossible without an automated or semi-automated system implemented in accordance with some embodiments of the disclosed subject matter.

As yet another more particular example, a consultant or investor can partner with an institution such as a university to facilitate a more robust technology transfer program by identifying student that may be interested in taking on the risks associated with commercializing a product based on research performed at the university. In such an example, the investor or consultant can use process 400 and/or process 500, depending on how much access is provided to the institutions grade data.

As another example, process 500 can be used by relatively large employers to identify entrepreneurial employees from an existing employee pool, a pool or applicants, and/or a pool of potential applicants (e.g., a student body) using grade information.

As a more particular example, process 500 can be used by a relatively large employer to identify entrepreneurial applicants to hire if the employer is interested in fostering innovation and/or encouraging the creation of spin-off companies or subsidiaries, in which the employer would retain equity and/or some level of managerial supervision.

Figure 6:
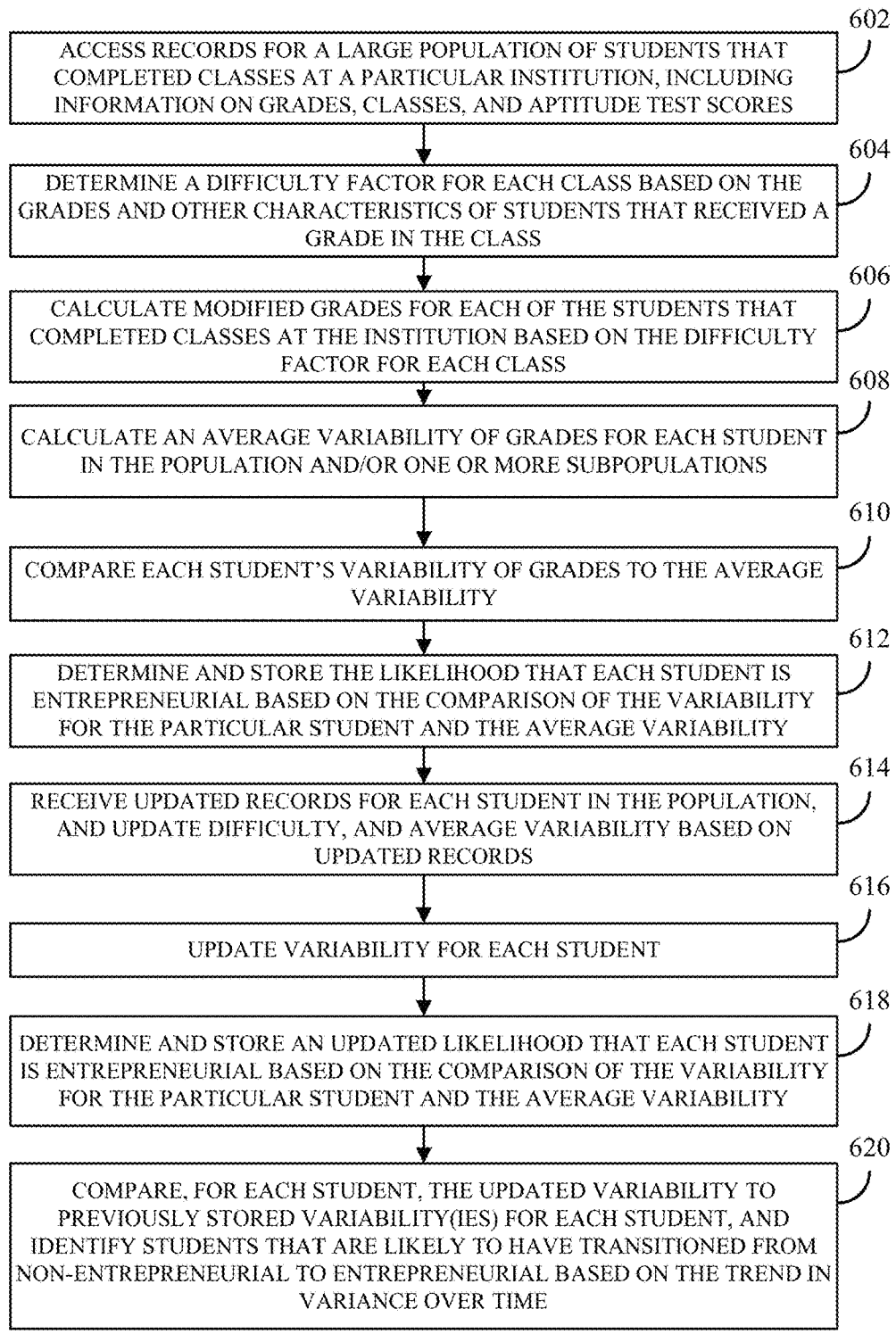
FIG. 6 shows an example of a process for automatically identifying entrepreneurs in a population using individual and population level secondary data in accordance with some embodiments of the disclosed subject matter.

FIG. 6 shows an example 600 of a process for automatically identifying entrepreneurial individuals in a population using individual and population level secondary data in accordance with some embodiments of the disclosed subject matter. At 602-608, process 600 can execute operations similar to operations described above in connection with 402-408 of FIG. 4.

At 610, process 600 can compare each individual's variability of grades to the average variability. For example, process 600 can compare the coefficient of variation of each individual's grades to the average coefficient of variation grades among the entire population of the institution and/or to one or more sub-populations to which the individual belongs.

At 612, process 600 can determine and/or store the likelihood that each individual is a candidate to be an entrepreneur based on the comparison. For example, the likelihood can be based on the amount by which the individual's variability exceeds (or does not exceed) the average variability. In some embodiments, the likelihood can be stored in one or more databases, such as population database 122 and/or grade and profile database 132 described above in connection with FIG. 1. In some embodiments, the individual's likelihood of being entrepreneurial can be a searchable field, such that the individual's that are most likely to be entrepreneurial can be easily determined. For example, the institution can provide a list of individuals that may be interested in becoming entrepreneurs to an investor that is interested in investing in a business to further develop a technology developed by a student, professor, or community member. As another example, an investment firm can be granted access to information on grades, classes, and/or aptitude test scores, and can use the mechanisms described herein to generate signals that can be used to inform investment recruitment and/or investment selection decisions.

At 614, process 600 can receive updated records for each individual that is a current member of the student population (e.g., after the end of a term), and can update course difficulties, and average variability of grades for the population and/or various sub-populations.

At 616, process 600 can update the variability of grades for each individual that received one or more additional grades based on modified grades (e.g., as described above in connection with 306).

At 618, process 600 can determine and/or store an updated likelihood that each individual is entrepreneurial based on the difference between the individual's individual variability and the average variability for the population and/or one or more sub-populations (e.g., as described above in connection with 612).

At 620, process 600 can compare, for each individual, the updated variability for each individual to that individual's past variability or variabilities. In some embodiments, based on the trend in variability for an individual, process 600 can determine that a particular individual has changed from being unlikely to be entrepreneurial to becoming more entrepreneurial. For example, if the variability was relatively average and showed little change between terms for the first two years of a individual's time at the institution, but the variability increased substantially during the beginning of the individual's third year and continued to be relatively high, process 600 can determine that the user may have become more entrepreneurial.

FIG. 7 shows an example of a histogram of mean grades for a large sample of students before and after an adjustment for course difficulty.

Note that, in some embodiments, the amount by which the variability of a first individual's grades exceed the average variability at a first institution can also be compared to the variability of another individual's grades exceed the average variability at a different institution, which may be indicative of which of the individuals would likely be more entrepreneurial.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIGS. 3-6 can be executed or performed in any order or sequence not limited to the order and sequence shown and described in the figures. Also, some of the above steps of the processes of FIGS. 3-6 can be executed or performed substantially simultaneously where appropriate or in parallel to reduce latency and processing times.

Appendix C includes further explanations and examples related to the disclosed subject matter, and is hereby incorporated by reference herein in its entirety. Appendices A and B filed in connection with U.S. Provisional Application No. 62/667,367 also include further explanations and examples related to the disclosed subject matter, and each is hereby incorporated by reference herein in its entirety.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for automatically identifying potential entrepreneurs in a population of individuals using individual and population level data, the system comprising:
   a database storing:
   for each individual of a plurality of individuals:
   a success level for each of a plurality of entrepreneurial activities completed by the individual;
   identifying information of the entrepreneurial activity corresponding to each success level;
   one or more hardware processors that are configured to:
   receive, from the database, identifying information of the plurality of entrepreneurial activities completed by each of the plurality of individuals;
   receive, from the database, the outcome for each entrepreneurial activity for which identifying information was received;
   calculate, for each of the plurality of entrepreneurial activity, a difficulty value of the entrepreneurial activity based on the success level for each individual having a success level for that entrepreneurial activity;
   modify, for each of the plurality of individuals, each of a plurality of success levels associated with the individual based on the difficulty value of an entrepreneurial activity corresponding to the success level;
   determine, for each of the plurality of individuals, a variation metric associated with the individual's success level using the modified success level;
   determine, based on the variation metric for each of the plurality of individuals, an average variation metric;
   receive, for a first individual, a success level for each entrepreneurial activity completed by the first individual and corresponding identifying information for the plurality of entrepreneurial activities;
   modify the first individual's success level based on the difficulty value of the entrepreneurial activity corresponding to the success level;
   determine the variation metric of the first individual's success level using the first individual's modified success level;
   determine that the variation metric of the first individual's success level is larger than the average variation metric;
   in response to determining that the variation metric of the first individual's success level is larger than the variation metric, determine that the first individual is more likely than average to be entrepreneurial; and in response to determining that the first individual is more likely than average to be entrepreneurial, add identifying information of the first individual to a second database of potential entrepreneurs.

2. A system for automatically identifying entrepreneurial individuals in a population, the system comprising:
one or more hardware processors that are configured to:
receive, from one or more databases, identifying information of a plurality of classes completed by each of a plurality of individuals, wherein each of the plurality of classes is associated with an institution;
receive, from the database, a grade for each class for which identifying information was received;
determine, for each of the plurality of individuals, a variation metric associated with the individual's grades;
determine, based on the variation metric for at least a subset of the plurality of individuals, an average variation metric;
receive, for a first individual, a grade for each class completed by the first individual;
determine the variation metric of the first individual's grades;
determine that the variation metric of the first individual's grades is larger than the average variation metric;
in response to determining that the variation metric of the first individual's grades is larger than the variation metric, determine that the first individual is more likely than average to be entrepreneurial;
in response to determining that the first individual is more likely than average to be entrepreneurial, associate information indicating that the first individual is more likely than average to be entrepreneurial with the first individual.

3. The system of claim 2, wherein the variation metric is a variance.

4. The system of claim 2, wherein the variation metric is a coefficient of variation.

5. The system of claim 2, wherein the average variation metric is associated with a particular institution, and
wherein the one or more hardware processors are further configured to:
determine a plurality of average variation metrics, each associated with a different institution; and
determine that the variation metric of the first individual's grades is larger than the average variation metric associated with the institution associated with the first individual.

6. The system of claim 2, wherein the one or more hardware processors are further configured to determine that the variation metric of the first individual's grades is larger than the average variation metric by at least one standard deviation above the average variation metric.

7. A method for identifying entrepreneurial individuals associated with an application for venture funding, the method comprising:
receiving grade information associated with each of a plurality of individuals;
determining, for each of the plurality of individuals, a variation metric associated with the individual's grades;
identifying a plurality of institutions, each of the plurality of institutions associated with at least one of the plurality of individuals;
determining, for each institution associated with at least one individual, that an average variability metric associated with the institution is not stored in the memory;
identifying a first source of grade variability data for a first institution of the plurality of institutions, wherein the first institution is associated with a first individual of the plurality of individuals, the first individual associated with a first application for venture funding;
retrieving grade variability data for the first institution from the first source of grade variability data;
determining that the variation metric of the first individual's grades is larger than the average variation metric associated with the first institution by at least one standard deviation; and
causing information to be presented indicating that the first application for venture funding is associated with an individual that is more likely than average to be entrepreneurial.

8. The method of claim 7, further comprising:
identifying a second source of grade variability data for a second institution of the plurality of institutions, wherein the second institution is associated with a second individual of the plurality of individuals, the second individual associated with a second application for venture funding;
retrieving grade variability data for the second institution from the second source of grade variability data;
determining that the variation metric of the second individual's grades is not larger than the average variation metric associated with the second institution by at least one standard deviation; and
causing information to be presented indicating that the first application for venture funding is not associated with an individual that is more likely than average to be entrepreneurial.

9. The method of claim 7, wherein the variation metric is a variance.

10. The method of claim 7, wherein the variation metric is a coefficient of variation.

11. The method of claim 7, further comprising:
determining that grade variability data is unavailable for a third institution, wherein the second institution is associated with a third individual of the plurality of individuals;
determining that the third institution is likely to have similar grade variability to the second institution;
in response to determining that the third institution is likely to have similar grade variability to the second institution, determining that the variation metric of the third individual's grades is larger than an average variation metric based on the grade variability data for the second institution; and
causing information to be presented indicating whether the third individual is more likely to be entrepreneurial than the first individual.

* * * * *